United States Patent [19]

Voitas

[11] 4,241,483
[45] Dec. 30, 1980

[54] METHOD OF MAKING DRILL, BUSHINGS, PUMP SEALS AND SIMILAR ARTICLES

[75] Inventor: Edward J. Voitas, Mahwah, N.J.

[73] Assignee: Eastern Fusecoat Incorporated, Hawthorne, N.J.

[21] Appl. No.: 36,504

[22] Filed: May 7, 1979

Related U.S. Application Data

[60] Division of Ser. No. 871,844, Jan. 24, 1978, Pat. No. 4,169,637, which is a continuation-in-part of Ser. No. 603,242, Aug. 8, 1975, Pat. No. 4,087,137.

[51] Int. Cl.³ ............................................. B21D 53/10
[52] U.S. Cl. ..................... 29/149.5 PM; 308/DIG. 8; 308/237 R; 308/241; 228/122
[58] Field of Search ............ 308/237 R, 241, DIG. 8; 228/122, 124; 29/149.5 S, 149.5 PM, 149.5 NM

[56] References Cited

U.S. PATENT DOCUMENTS

| | | | |
|---|---|---|---|
| 3,296,693 | 1/1967 | Carter | 228/124 |
| 4,087,137 | 5/1978 | Voitas | 308/237 R |
| 4,125,637 | 11/1978 | Tanner | 29/149.5 NM |
| 4,169,637 | 10/1979 | Voitas | 308/DIG. 8 |

Primary Examiner—Francis S. Husar
Assistant Examiner—V. K. Rising
Attorney, Agent, or Firm—Samuelson & Jacob

[57] ABSTRACT

A method of making a drill bushing or a similar article, such as a pump seal, the method including metallurgically bonding tungsten carbide within a matrix to the steel blank by treating the combination in a vacuum, hydrogen, salt bath or other heating medium, making a suitable central opening, where required, in the tungsten carbide, heat treating and finishing the piece to the proper dimensions.

The method of making such articles also includes metallurgically bonding tungsten carbide particles within a matrix which is also metallurgically bonded to a steel body, making a suitable opening, where necessary, leaving a thin coating of matrixed tungsten carbide to improve resistance to wear, heat and corrosion and then finishing the piece to the proper dimensions.

The method may include metallurgically bonding tungsten carbide particles within a matrix bonded to a steel body while under the influence of forces tending to eliminate voids in the completed coating of matrixed tungsten carbide.

17 Claims, 33 Drawing Figures

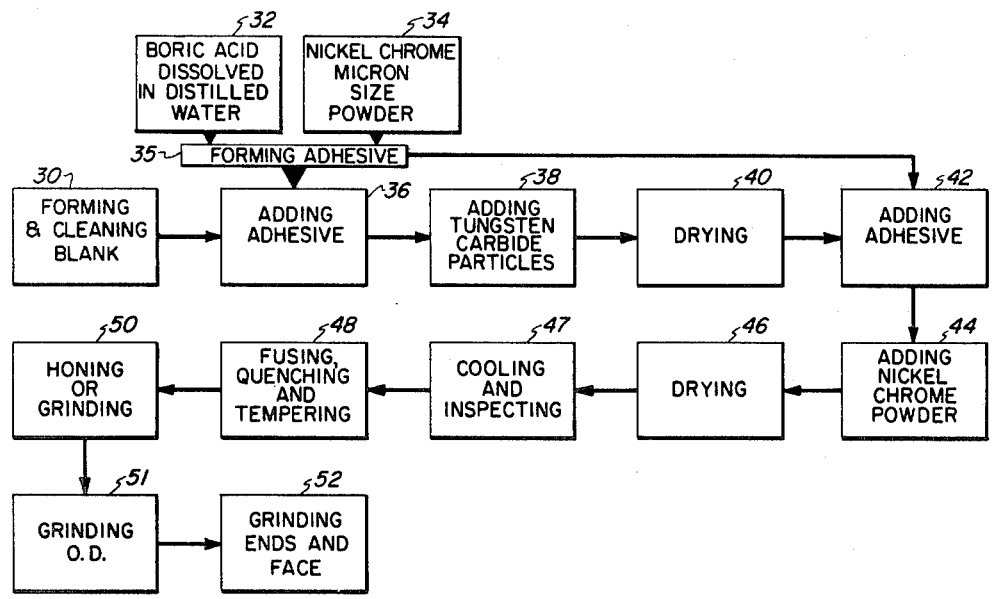
FIG. 1
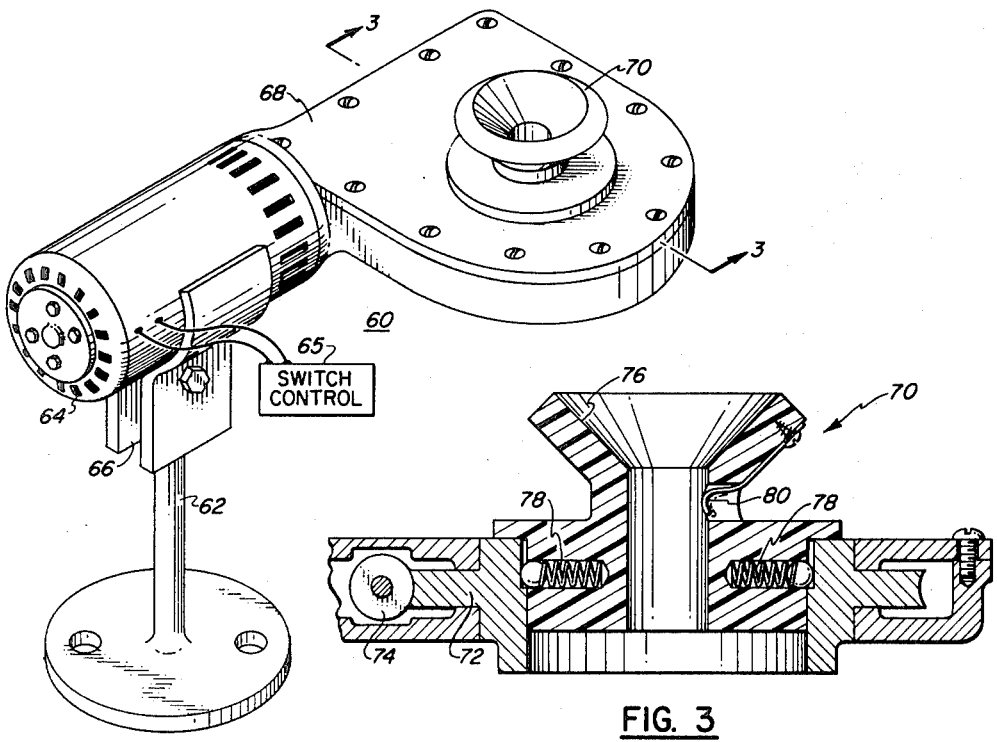
FIG. 2
FIG. 3

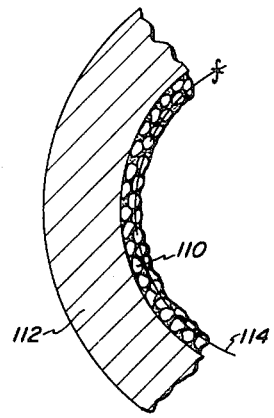
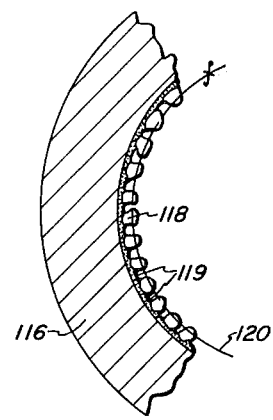
FIG. 6  FIG. 7
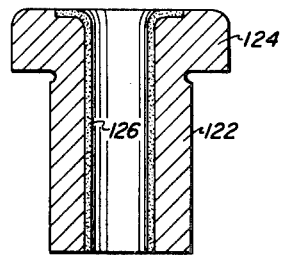
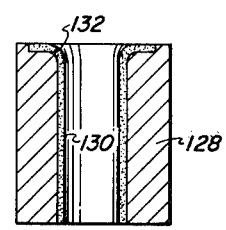
FIG. 8  FIG. 9
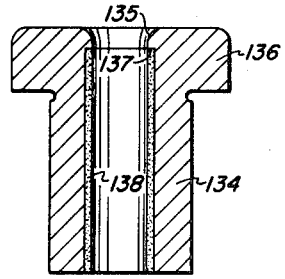
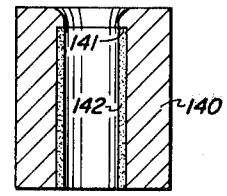
FIG. 10  FIG. 11
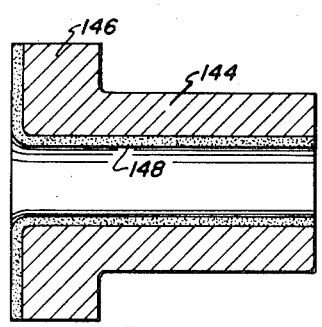
FIG. 12

METHOD OF MAKING DRILL, BUSHINGS, PUMP SEALS AND SIMILAR ARTICLES

This is a division of my application Ser. No. 871,844, filed Jan. 24, 1978, and now U.S. Pat. No. 4,169,637, issued Oct. 2, 1979 which was a continuation-in-part of my earlier application, Ser. No. 603,242, filed Aug. 8, 1975, now U.S. Pat. No. 4,087,137 issued May. 2, 1978.

The invention relates to a method of manufacturing articles of manufacture such as drill bushings which are used throughout industry and are commonly incorporated into drill jigs. While the principal thrust of the invention is directed toward providing devices which are commonly referred to as drill bushings, it is also within the scope of the invention to provide pump seals, bearings, guide bushings, spray nozzles and similar articles.

Drill jigs are used to insure the accurate location of a hole, which is to be drilled into a work piece with respect to a fixed reference point or with respect to another hole or pattern of holes. This reference point is used to maintain accurate location of a pattern of holes in the work piece or part which is accurately reproducible over a long production run of such parts. In order to maintain this accurate, small tolerance condition, it is necessary to guide the drills to very close tolerances and to maintain these tolerances throughout the production. This is accomplished by using articles of the invention as drill jig bushings.

The prior art drill jig bushings have been and generally are made of high carbon or alloyed tool steel which have been heat treated to improve hardness. Such bushings provide reasonable drill guidance over their life. The life is relatively short because it is limited by the wear resistance characteristics of the metal. Attempts have been made to improve wear life by using high speed steel of various specialized alloys. These drill jig bushings are much more expensive and leave much to be desired in terms of wear life when they are used, for example, in the drilling of material containing asbestos or other abrasives such as encountered in cast iron.

Alternatively, when long wear life has been the critical element in a production problem, industry has turned to solid tungsten carbide drill bushings. These bushings which are usually solid throughout their cross-section, have several disadvantages. First and foremost, the cost is about 10 to 20 times that of high speed steel. Second, these parts are brittle and are often damaged during installation in the drill jig or are chipped by the tool itself. Various attempts, having limited commercial success, have been made to fabricate a tungsten carbide liner adapted to be pressed or brazed into a steel or other metal body. These units, too, are quite expensive being about 10 to 20 times to cost of tool steel bushings. Moreover, these units which use tungsten carbide fully-inserted bushings or rings brazed, welded or mechanically held in place in a tool or alloy steel body, have sufficient mass of tungsten carbide so that the coefficient of expansion characteristics of tungsten carbide control the expansion of the bushing. Thus, when tool steel tools are used with these bushings, the difference between the coefficient of expansion of the bushing and the coefficient of expansion of the tool, may produce tool seizure. Tool seizure results from the fact that as the tool heats up, its coefficient of expansion is such that it expands at twice the rate of the solid carbide bushing or the one with large inserted masses of tungsten carbide in the form of sleeves or rings. Therefore, initial clearance must be sufficient to avoid this with close tolerance being sacrificed at least during the early period of operation until the tool expands sufficiently to close the excess tolerance. When there are very accurate tool guiding requirements, the tool may be seized and bound after it has been operated for a while.

The production cost of solid tungsten carbide bushings is high because, among other things, the part must be pressed to shape and sintered and then must be ground with a diamond grinding wheel in order to complete the finishing process. Another important disadvantage, which results from the use of solid tungsten carbide is the inability to manufacture drill bushings with a variety of outside shapes. This is inherent in the material characteristics since solid tungsten carbide is difficult to grind and is brittle.

Accordingly, it is an important object of the invention to provide a method for making an article, such as a drill bushing or a pump seal, which will maintain its accuracy and possess a longer life than the presently used articles. Such an article will maintain the design clearance between complementary moving parts because the body is steel and the coating whose thickness ranges from 0.003"–0.005" is composed of tungsten carbide particles distributed throughout a matrix of nickel chrome. This allows the coating to have substantially the same coefficient of expansion as the tool steel body.

It is another object of the invention to provide such a method so that the article will have a surface with the abrasion and wear resistance of similar articles formed of solid tungsten carbide.

It is a further object of the invention to provide such a method so that the article is economical to produce and will sell for a fraction of the cost of tungsten carbide drill bushings.

It is a still further object of this invention to provide a method which circumvents the undesirable feature of solid tungsten carbide or inserted sleeve or ring type bushings to provide in one of its embodiments, a method for making a bushing which has exposed tool steel at the entering end to thereby avoid tool damage that could occur in the event an off-center tool came in contact with tungsten carbide. Beyond the bellmouth or tapered entry side of the drill bushing the thin layer of tungsten carbide provides the highly wear resistant surface.

It is yet another object of the invention to provide a method for making an article whose body is formed of alloy or tool steel and which is provided with a thin coating of tungsten carbide particles which are metallurgically bonded in a matrix of nickel chrome to the body.

It is still another object of the invention to provide a method for making such an article so that the tungsten carbide particles of controlled micron size are contained in a matrix of nickel chrome so that the matrix has about the same coefficient of thermal expansion as the body and the drill or rotating shaft inserted in the bushing.

It is a still further object of the invention to provide a method for making such an article so that the article has as good or better wear characteristics when compared to solid tungsten carbide articles and also is less likely to chip or crack in use or during installation.

It is yet a further object of the invention to provide a method for making an article such as a bushing which has improved lubrication properties because there is produced within the bushing a surface which is unlike a thin solid surface and which has the interstices between the micron size particles of tungsten carbide filled with matrix material. This is accomplished by controlling the amounts of matrix materials sufficient to insure metallurgical bonding to the bushing proper and avoiding filling all the voids or interstices between the particles. Thus, interstices are left for the passage of oil or lubricants between the tungsten carbide particles even while a solid shaft or tool having a close fit is rotated within the bushing.

It is a still further object of the invention to provide a method for making such an article so that the inside diameter is lined with a thin coating of tungsten carbide and a controlled amount of matrix which when finished to the proper inside diameter dimension leaves a multiplicity of tool bearing points which are generated by the partial cutting of the particles to a condition wherein each particle, so exposed, provides a bearing point while, at the same time, leaving the interstices between particles free to allow lubricant to flow freely.

Another object of the invention is to provide a method for making such an article so that the coating of tungsten carbide particles distributed throughout a matrix of nickel chrome is dense and relatively void free.

A further object of the invention is to provide a method for making such an article so that the coating of tungsten carbide particles distributed throughout a matrix of nickel chrome is compacted so as to eliminate entrapped gases or other lightweight foreign material which will be driven from the coating during centrifugal or vibratory compaction.

Still another object of the invention is to provide a method for making such an article so that the coating is placed upon a flat surface to provide a flat, wear-resistant surface on the article.

These and other objects, advantages, features and uses will be apparent during the course of the following description when taken in conjunction with the accompanying drawing.

Broadly, one article constructed by the method of the invention comprises a hollow steel body with various configurations, having a coating of a matrix of a material such as nickel chrome added to the inside diameter thereof. Micron size particles of tungsten carbide are uniformly distributed throughout the matrix which provides a metallurgical bond to the steel body and a metallic bond to each such particle. The coating, as applied, has a thickness of the order of between 0.006" and 0.008". Final finishing reduces the thickness to the order of approximately 0.003".

While tungsten carbide particles are preferred, particles of other materials having a hardness of 84–93 Rockwell C may also be used. Similarly, a matrix of material having a hardness of 59–67 Rockwell C may be used in place of the preferred nickel chrome material.

The body and the matrix have about the same coefficients of thermal expansion so that there is little internal strain introduced as the articles heat up from friction during use. Moreover, the article has almost the same coefficient of thermal expansion as that of the drill or shaft which rotates in the hollow opening so that more accurate fitting is initially possible and there is no binding as the temperature rises during use. The term which is normally used to describe the condition, which occurs when the tool expands at a much faster rate than the bushing, is "seized" or "frozen" which indicates metal-to-metal interference. It is also within the contemplation of the invention to provide an article having a surface which has interstices and voids between the particles of tungsten carbide to allow oil, lubricants or coolants to flow freely or be pumped between the inside wall of the bushing and the shaft or tool. Articles of the invention avoid freezing or seizing while still maintaining close clearance between tool and bushing.

The method of the invention for producing bushings of 0.140" diameter or larger broadly comprises applying a thin coating of selected mesh particles of tungsten carbide to the inner longitudinal opening of the body, adhering the particles in place with a suitable adhesive and then applying successive layers of nickel chrome matrix or other suitable alloy and fusing it metallurgically in a vacuum or hydrogen controlled atmosphere or salt bath furnace to allow the matrix material in its liquidous state to fill the interstices between the tungsten carbide particles and also diffusion bonding itself to the inner longitudinal wall or face, as well as providing a bond to the tungsten carbide particles. The body is quenched for heating directly from the fusion stage and annealed. The body may be rotated about its longitudinal axis after applying the tungsten carbide particles and again during fusion to compact the tungsten carbide particles and to aid in filling all the voids in the coating.

The inside of the body is rough honed, or ground, then finish honed or lapped to its proper inside diameter. Then the outside of the body is ground to its proper diameter and configuration.

The method of the invention for producing small size bushings differs slightly from that for large bushings. A bushing with a blind hole has adhesive applied to its inner wall, the hole is fully filled with micron size tungsten carbide particles which have been pretreated with a solution of adhesive material which has nickel chrome powder suspended in solution throughout, this insures proper fluxing and bonding to the bushing and of the tungsten carbide to the matrix to be added to the next step. At this step, the cup shaped portion of the bushing is filled with nickel chrome or other suitable alloy and is treated with adhesive, the article is placed in a vacuum furnace, hydrogen controlled atmosphere furnace or salt bath furnace and when the temperature is brought up to the liquidous state of the matrix material, the excess of matrix material fills the voids and interstices to form a solid plug of tungsten carbide particles, fully bonded to the inner longitudinal wall and to itself. The article may be rotated while the matrix is in the liquidous state to induce forces which will aid in filling all the voids in the coating. The body's outside diameter is ground after heat treating and the hole is pierced to an accurate diameter with an electrochemical machine, an electro-discharge machine or a laser beam and is then honed or lapped to its final accurate diameter and surface finish. In the industry, surface finish is designated in units of rms.

The method of the invention for producing pump seals or like articles with flat wear-resistant surfaces is similar to the above-described methods, with the exception that the article is vibrated, rather than rotated, during fusion of the coating to induce forces tending to eliminate voids in the coating.

In the accompanying drawing, forming a part of this application and in which like numerals are employed to designate like parts throughout the same:

FIG. 1 is a block diagram showing the steps in the method of the invention for forming articles having an inside diameter of the order from about 0.140" up to several inches;

FIG. 2 is a perspective view of a machine used for carrying out some of the steps of the method of the invention used in the manufacture of articles having an inside diameter of the order of 0.140" to 0.750";

FIG. 3 is a sectional view, taken on lines 3—3 of FIG. 2, viewed in the direction of the arrows;

FIG. 6 is an enlarged sectional view of a portion of an article of the invention having a dense coating on the inner surface;

FIG. 7 is a view, similar to that of FIG. 5, showing an article made by a method of the invention and having interstices between the tungsten carbide particles;

FIG. 8 is a sectional view of an article made by a method of the invention and having a head and a coating on the inner surface and on a portion of the head;

FIG. 9 is a view similar to that of FIG. 8 of a nonheaded article made by a method of the invention and having a coating on the inner surface and on a portion of the top of the article;

FIG. 10 is a view similar to that of FIG. 8 of a headed article made by a method of the invention and wherein the head is uncoated;

FIG. 11 is a view similar to that of FIG. 8 of a headed article such as a pump bushing made by a method of the invention and wherein the inner surface and top surface of the head of the article are coated;

FIG. 12 is a view of a pump bearing;

Figure 4:
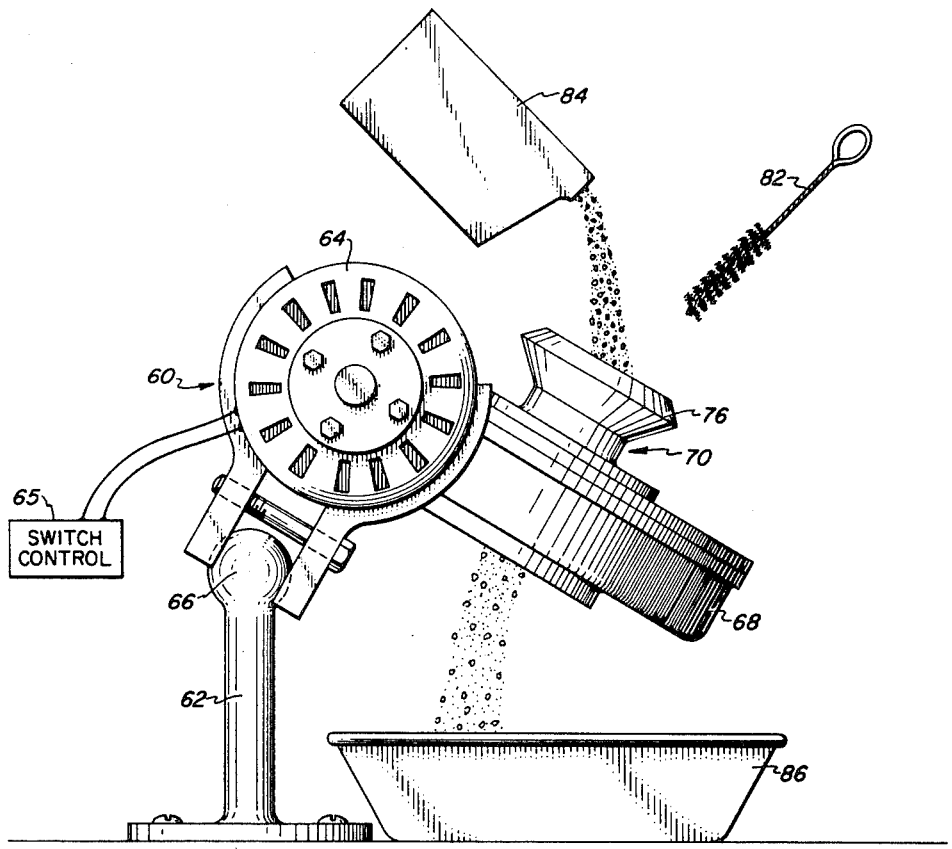
FIG. 4 is a view of the machine of FIG. 2 showing its use in the manufacture of articles of the invention.

In the drawing, wherein, for the purpose of illustration, are shown various embodiments of the invention, the numeral 30 (FIG. 1) designates the step of forming and cleaning the blank. Step 30 is preferably carried out by machining the part on conventional machine tools. The part must be chemically clean and free of oil, dirt or other contaminants. A preferred method of cleaning is to batch clean the articles in a hydrogen atmosphere furnace. This results in metallurgical cleansing of the articles preparatory to the next step.

After the foregoing procedure has been carried out, boric acid dissolved in distilled water (step 32) and micron size powder of nickel chrome (step 34) are combined to form an adhesive (step 35). The adhesive has the consistency of heavy oil. The consistency can be controlled by varying the amount of nickel chrome powder and can be reproduced by accurate control of the ratio of fluid measure to weight of the nickel chrome. Such control insures repetitive consistency of the amount of nickel chrome in suspension. The adhesive so formed is added to the inner surface of the piece (step 36). Next (at step 38), the tungsten carbide particles are applied to the wet adhesive coated surface. The tungsten carbide particles are added while the adhesive is still wet so that they are caught in a manner similar to the result obtained when sugar comes in contact with a wet finger. The amount of such adherence will depend on the mesh size of the particles. The piece is now dried (step 40) at a temperature of the order of 350°–400° F. for a period of time required to bring the part up to uniform temperature and sustained for such time as is required to evaporate all the water and moisture out of the adhesive. To dry articles of the invention on a production basis, the drying (step 40) is done in a conveyor type oven at about 350°–400° F. The heating time depends on the mass of the part but the heating time and temperature must be sufficient to insure that all water and moisture is evaporated and removed from the part. Now, the part is cooled to room temperature and the adhesive formed in step 35 is applied over the tungsten carbide layer (step 42). It may be necessary to use one or more coats of adhesive because some of it may be soaked up by the tungsten carbide particles.

At step 44, nickel chrome particles of 140–250 mesh are applied over the wet adhesive. The number of particles which adhere is determined by the amount of adhesive and the mesh size of nickel chrome as the major parameters. The small the mesh size, the more solid the coating, so that if a solid coating, free of voids and with filled interstices, is desired, a small mesh size is used. On the other hand, if it is desirable to leave voids and open interstices for lubrication or other operating functions, larger mesh sizes should be used.

The article is now oven dried (step 46) at temperatures of the order of 350°-400° F. for the amount of time required to bring the piece up to a predetermined temperature which temperature is sustained until all the water is evaporated out of the adhesive. Here, again, the drying is carried out in a conveyor type oven at a temperature of the order of 350°-400° F. for a time which depends on the mass of the article. The cycle should be sufficient to insure that all water and moisture is evaporated from the part. The part is cooled to room temperature (step 47). When cool it is inspected and any excess particles of tungsten carbide and/or adhesive on the surfaces may be removed with a knife or similar instrument.

Next (step 48) the coating is metallurgically fused to the blank by placing the article in a vacuum furnace, hydrogen atmosphere controlled furnace or in a salt bath furnace, with best results being produced in the vacuum furnace at a temperature of the order between 1925° and 2025° F. The part is held at that temperature for about 3 to 5 minutes to insure that the nickel chrome material reaches the liquidous state and the entrapped gas is evacuated so that the nickel chrome flows into the interstices between the tungsten carbide particles. If the furnace has a quench chamber, the parts go directly from the fusing step to quenching. If it does not, a separate quench bath is required. After quenching, the part is tempered to bring it to the desired hardness. After the part is tempered, the inside diameter of the piece is honed or ground (step 50) and lapped to the proper dimensions and smoothness. The particular technique used to finish the inside diameter (I.D.) of the piece accurately depends upon its size and shape.

The bushing (part of piece) is mounted on a mandrel and the outside diameter (O.D.) is ground to insure concentricity with the I.D. to within 0.0002" or less (step 51). Now, using the ground O.D. surface as a chucking surface, the ends and face of the piece are ground to the proper smoothness and dimensions (step 52).

FIGS. 2, 3 and 4 illustrate a machine for carrying out the coating portion of the method of the invention for producing articles having an outside diameter of one inch or less and an inside diameter not smaller than about 0.140 inch. The machine is designated by the numeral 60 and is seen to comprise a pedestal 62, a motor 64 which is mounted on the pedestal by means of a universal position ball mount 66 and a drive casing 68. The drive casing 68 contains a gear box and a worm drive for rotating a jig 70. Motor 64 is preferably a d-c gear motor with a foot controlled switch 65. The switch 65 controls the motor speed to permit the operator to vary the motor speed and the jig rotation speed during the coating process.

The jig 70 (FIG. 3) comprises an outer drive ring or worm gear 72 which is driven by a drive 74 so as to rotate a holder 76. The holder 76 is locked in position with respect to drive ring 72 by means of ball lock retainers 78. The bushing to be coated is placed in holder 76 and is held in position by means of one or more spring clips 80.

FIG. 4 illustrates the attitude of machine 60 for coating the inner surface of a bushing piece. The bushing is slipped into place and held by the spring clip 80 (FIG. 2). A brush 82 is used to apply the adhesive to the inner surface of the bushing while the holder is rotated. After the inner surface is coated with adhesive, while wet, tungsten carbide particles are poured from a container 84 into the bell of holder 76 as the holder is rotated. The particles which do not adhere to the piece drop into a recovery pan 86. The piece is then removed from the holder and dried. The piece is reinserted in the holder and is again coated with adhesive and while still wet, nickel chrome or suitable alloy is poured from container 84 into the bell of holder 76. The excess falls into the recovery pan 86, (i.e. those particles which do not adhere to the wet adhesive). The part is then dried. Preferably, the d-c motor 64 is controlled by foot switch 65 to give the operator variable speed control, but any suitable control means may be used with the motor.

Figure 5:
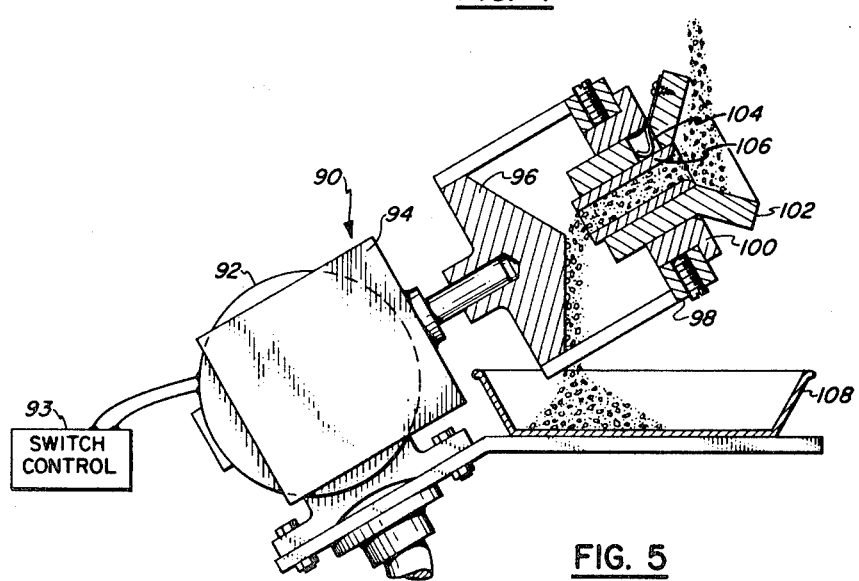
FIG. 5 is a view partly in section, showing a modified machine for use in the manufacture of articles having an inside diameter of the order of 0.750" to 6" or more.

FIG. 5 illustrates a modified machine 90 for making articles having inside diameters of the order of about ¾" to 6". This machine is actually larger than that of FIG. 4 but it is drawn to a smaller scale than is FIG. 4. Machine 90 comprises a d-c gear motor 92 which is a variable speed and is foot switch controlled by foot switch 93, which is similar to switch 65, a gear box 94 and a gear hub 96. The gear hub 96 supports and rotates a drive plate 98 inside of which there may be mounted a sleeve 100 which is of the proper size to hold a holder 102 in position. A clip 104 holds a bushing 106 in position. Operation is the same as has previously been described and the nonadhering material is recovered in a pan 108.

FIG. 6 is an enlarged view showing a portion of the inner surface of an article wherein several layers of a matrix 110 of tungsten carbide and nickel chrome have been fused to the body 112. For the purpose of illustration, the several layers of a matrix 110 are shown as particles, but during the furnace fusing step, the particles of nickel chrome pass into the liquidous state, and fill all the voids and interstices between the tungsten carbide particles, which retain their original shape and do not go into solution. The nickel chrome becomes solidified. It is metal fusion bonded to the inner wall of the bushing, bonding the particles of tungsten carbide and since the adhesive is also a fluxing agent, it allows the surface of the tungsten carbide particles to be wetted and bonded to the nickel chrome. When the surface is finished along the line 114, it can be seen that the surface presents a substantially solid dense surface of tungsten carbide. By properly controlling the particle size of the tungsten carbide, up to 90% or more of the finished surface will be exposed solid tungsten carbide. This depends on the mesh or particle size used and the amount and type of finishing. Each exposed particle of tungsten carbide has an exposed surface of the proper diameter to thereby contribute to the total wear resistant surface. Such an article will possess a long life since the tungsten carbide used is a cast grade ranging up to 9.9 on the MOHR scale. On that scale the diamond is 10.0 and the normal sintered tungsten carbide bushing may only reach 9.3-9.4. Consequently, as long or longer life may be expected from bushings made by a method of the invention over those of the prior art. This is particularly true when the bushing is used in the processing of abrasive material.

FIG. 7 is a view similar to that of FIG. 6 and shows a body 116 to which an essentially single layer of tungsten carbide particles having their regular blocky shape have been applied and to which has been applied a controlled layer of nickel chrome matrix material. The nickel chrome reaches the liquidous state in the presence of the fluxing agent in the adhesive and the particles of tungsten carbide are wetted with nickel chrome during the furnace fusing step. The excess nickel chrome clings to the wall and gathers in fillets 119 of nickel chrome at the base of each particle of tungsten carbide 118. This provides great mechanical strength against tool pressures and forces. Heat treating follows the fusing stage. When the surface is finished along line 120, it can be seen that the particles of the matrix are dispersed so that the lubricant used during drilling and similar processes can move through the interstices and reduces the likelihood of freezing. The interstices also act as reservoirs of lubricant. However, the wear life of this article will be lower than that of the article of FIG. 6. Either coating structure may be used with the articles to be described below.

As described heretofore, the article of FIG. 7 will, after grinding, lapping, honing or otherwise finishing the coated surface, be such that each exposed particle of the tungsten carbide now has an exposed surface of the proper diameter. In total, up to 80% or more of the total inner or coated surface will be exposed as a wear resistant surface, but the interstices will provide passages permitting the free flow of lubricants and/or coolants below the finished surface 120.

Figure 19:
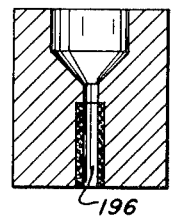

FIG. 8 illustrates an article for use as a drill bushing having a body 122, a head 124 and a matrix of nickel chrome throughout which are distributed particles of tungsten carbide 126 fused to the inner surface of the body 122 and a portion of the inner surface of the head 124. When bushings of this type are used, there is virtually no wear on the steel forming the head or top of the bushing, the body proper being contained in the drill jig, fixture, etc., but it is recognized that the bell mouth being coated with wear resistant tungsten carbide can damage the cutting edge of a tool formed of high speed steel if the tool enters off center. Consequently, in some operations this coating of the bell mouth is undesirable and leads to the need of the configurations shown in FIGS. 10, 11 and 19.

FIG. 9 illustrates a bushing having a body 128 and a matrix 130 of tungsten carbide and nickel chrome fused to the inner surface and to a portion of the upper surface as shown at 132. This type of bushing, in general, is a headless type and is used where the working surface must be flat and clear of projections and the bushing must present a flat unobstructed surface. Here again, it may be desirable to utilize an uncoated bell mouth to reduce tool wear.

FIG. 10 illustrates a headed bushing having a body 134, a head 136 and a matrix 138 of tungsten carbide and nickel chrome. It is a view similar to FIG. 8, but the article has the coating only in the inner longitudinal diameter, limited as indicated by the recessed bore stopping at the shoulder 137. There is provided a bell mouth or entrance 135 for the tool or drill which is part of the parent material of the hardened drill bushing body 134 in order to protect the tool cutting edge from damage as it first enters the bushing. Such damage might occur if it were to contact a radial tungsten carbide surface with its cutting edge as shown in the bell mouths of FIGS. 8, 9 and 17. This is particularly true if the tool enters the entry hole 135 off center due to a tool running out of round or oscillating until controlled by the inside diameter of the bushing. It should be noted that run out or some oscillation is not unusual in long tools.

FIG. 11 is a view similar to that of FIG. 9 of a nonheaded bushing which comprises a body 140 to the inner surface of which there is applied a matrix 142 of nickel chrome throughout which are distributed particles of tungsten carbide. A shoulder 141 limits the application of the matrix 142 to the area shown in the figure. The bell mouth or entrance 143 for the tool or drill is formed of the parent material of the hardened bushing body and is not covered by the matrix so that the tool is protected from damage as it first enters the bushing. This is particularly true if the tool enters off center due to it running out of round or oscillating until its movement is controlled by the inside diameter of the bushing. It is thus seen that the bushings of FIGS. 10 and 11 are for the same general purpose.

FIG. 12 is a view of a pump bearing wherein the inner surface of the body portion 144 and the outer surface of the head 146 are covered with a matrix 148 of nickel chrome throughout which are dispersed micron size particles of tungsten carbide with a thickness in the order of 0.003"–0.005". Such bearings may also be made with the matrix just covering the outer surfaces of the head 146.

Figure 13:
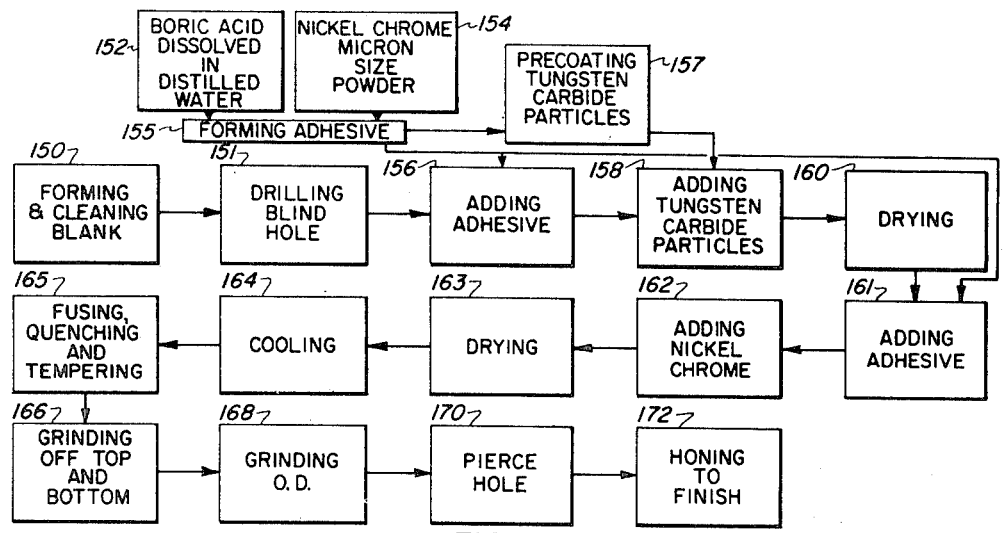
FIG. 13 is a block diagram similar to that of FIG. 1 showing the steps in the formation of small articles made by a method of the invention and having an inside diameter of the order of 0.005" to 0.140"

FIG. 13 is a block diagram of the method of the invention used in the production of small bushings having inside diameters of the order of between 0.005" and 0.140".

The blank is machined on conventional machine tools. Before proceeding with the coating process, the part must be chemically clean and free of any dirt, oil, etc. (step 150). The preferable method is to batch clean the bushings metallurgically in a hydrogen atmosphere controlled furnace. A blind hole is drilled in the blank (step 151). Tungsten carbide particles of the proper mesh size are precoated (step 157) with the adhesive formed in step 155. The adhesive mixture used in step 157 is thin and free-flowing so that there is a low concentration of nickel chrome in suspension. Preferably, the adhesive is poured into a container of the tungsten carbide particles an the combination is thoroughly mixed. The mixture is placed in, for example, a variable speed centrifugal to remove the excess liquid. The wetted mixture is placed in a mixer where it is agitated in the presence of a hot air stream. This is done to dry both the adhesive coating and its nickel chrome powder on the individual tungsten carbide particles and to separate the particles.

Before the mixture is completely dried, the particles are lightly sprayed or dusted with a dry fog of nickel chrome powder which will adhere to the wet adhesive. This insures that there will be an adequate supply of nickel chrome to form fillets between the points of contact of the tungsten carbide particles and the body of the bushing. A greater quantity of precoated particles may be produced than is needed as the excess, after it is completely dry, may be stored in sealed containers for future use.

Now, boric acid dissolved in distilled water (step 152) and nickel chrome micron size powder (step 154) are added together to form an adhesive 155 having a consistency of heavy oil which can be varied in its consistency by using more or less nickel chrome powder. This can be accurately measured and reproduced by using predetermined ratios for fluid measure (step 152) to weight of nickel chrome (step 154) to insure repetitive consistency and the correct amount of nickel chrome in suspension in the adhesive. Now, (step 156) adhesive is applied to the inner surface of the longitudinal blind axial opening in the bushing. Next (step 158) the dry, precoated tungsten carbide particles of a predetermined mesh are placed in the longitudinal blind axial hole which had been drilled in the blank to a level which will assure an excess when the top is cut off in subsequent operations.

Now the articles are dried (step 160) by being placed in a conveyor type oven at about 350° to 400° F. The part remains in the oven until it reaches the established temperature and all moisture or water is evaporated out of the adhesive. The part is then allowed to cool at room temperature. Now, (step 161) adhesive is applied to the exposed projecting tungsten carbide particles and into the cavity formed by the coffer dam. Next, (step 162) a measured amount of nickel chrome is added to the top of the piece partially filling the coffer dam, and a few drops of adhesive are added into the small mass of nickel chrome powder in order to saturate the nickel chrome. There must be a sufficient amount of nickel chrome to insure that all the interstices between the tungsten carbide particles are filled with nickel chrome. The bushing is now dried (step 163) by being placed in a conveyor type oven at about 350° to 400° F. until the part reaches that temperature at which all moisture or water is evaporated out of the adhesive. The part is then allowed to cool at room temperature (step 164). Now, (step 165) the bushing is placed in a vacuum furnace, hydrogen atmosphere controlled furnace or salt bath furnace at a temperature of the order of 1925° to 2025° F. until the part has reached the desired temperature and is held at that point for 3 to 5 minutes. As the furnace is cooled down, the parts are removed at proper temperature for heat treating, quenched in the proper medium and then put through an annealing stage for the proper steel bushing hardness. This completes step 165. If a vacuum furnace is used, it is possible to move the bushing directly into a heat treating stage for quenching followed by annealing. At step 166 the top and bottom of the piece are ground off which removes the coffer profile as well. Now, the outside diameter is ground to the desired size and smoothness (step 168) and a hole of the desired size is pierced in the fused matrix (step 170). This pierced step may be carried out by either electrode discharge machining, electro chemical piercing, or in the case of very small holes, a laser beam can be used. Finally, the piece is honed and lapped to a final finished inside diameter and surface finish (step 172).

Figure 14:
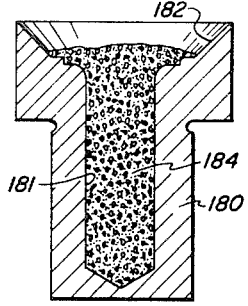
FIGS. 14–17 illustrate some of the steps used in the manufacture of articles made by a method of the invention and having inside diameters of the order of 0.005" to 0.140"
Figure 15:
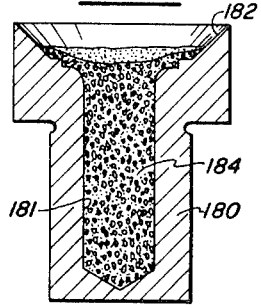
Figure 16:
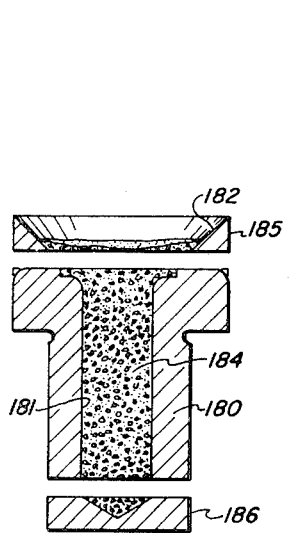
Figure 17:
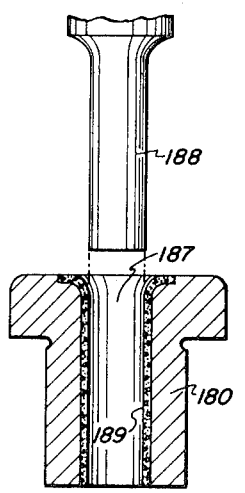

FIGS. 14-17 illustrate some of the steps used to produce a bushing of the configuration shown in FIG. 8, having an inside diameter between 0.0135" and 0.140" and an outside diameter between 0.250" and 0.500". In FIG. 14, the illustration shows a piece 180 into the top of which a coffer dam 182 has been machined during the process described in connection with FIG. 13 (step 150). Following the steps depicted in FIG. 13, the adhesive which is produced by mixing 152 and 154 of FIG. 13 is in step 156 applied to the wall of the longitudinal blind axial hole 181 in piece 180 of FIG. 14. Then (in step 158) this hole is filled with precoated particles 184 as illustrated in FIG. 14 and is dried in an oven as has been described (step 160). FIG. 15, shows the manner in which, after fusion, the small mound of nickel chrome has, in the liquidous state, seeped down between the particles of tungsten carbide filling all crevices and interstices between the particles to form a solid plug of tungsten carbide in a matrix of nickel chrome. The plug is of a predetermined diameter which will leave a wall thickness of about 0.003" to 0.005" after finishing. After cooling (step 164) and tempering (step 165) the top 185 and bottom 186 are ground off in step 166 (FIG. 16). The outside diameter is centerless ground (step 168) and then the hole is pierced using electro discharge machining, electro chemical machining or laser beam to pierce a hole 187 (step 170). Next, final honing and lapping is done to the proper diameter (step 172). FIG. 17 shows the finished bushing formed by means of electro discharge machining, electro chemical machining or a similar method as may be required. The electrode for an electro discharge machine is shown at 188 and the finished hole designated 187 is seen to have a suitable coating 189.

Figure 18:
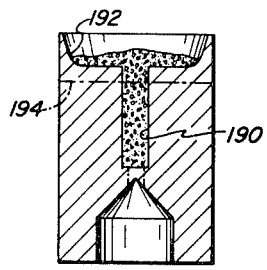
FIGS. 18 and 19 illustrate two of the steps used in the manufacture of articles made by a method of the invention and having inside diameters of the order of 0.005" to 0.140"

FIG. 18 illustrates a step in the method of producing very small bushings having inside diameters of the order from 0.005" to 0.140" and outside diameters of the order from 0.250" to 0.437". The opening 190 which is a square bottom longitudinal blind axial opening is coated with adhesive which is also a fluxing agent derived from mixing (step 152) and (step 154). The opening is then filled with particles to tungsten carbide of a predetermined mesh which have been precoated wih a dry coating of adhesive. This is equivalent to step 158 in FIG. 13. The piece is now dried as in step 160 of FIG. 13. The top cavity formed by coffer dam 192 has adhesive applied including the inside cavity formed by the coffer dam which is equivalent to step 161 and now, in the next step which is equivalent to step 162 of FIG. 13 particles of nickel chrome powder are placed in the coffer dam cavity while the adhesive is still wet with additional drops of adhesive added and the measured quantity of nickel chrome to insure that there is sufficient reservoir of metal during fusing (step 164 of FIG. 13) so that all cavities and interstices between the particles of tungsten carbide are filled to form a solid plug of tungsten carbide in a nickel chrome matrix. Prior to fusing (step 165) a drying stage must be completed which is equivalent to step 163 in FIG. 13. The piece may be taken out of the furnace at the proper temperature and quenched for hardening and then followed by annealing. Now, in step 166 of FIG. 13, any suitable method may be used to remove the top along line 194. At the same time the opposite end is sized to obtain the proper overall length of the bushing. In the next step, equivalent to step 168 of FIG. 13, the outside diameter is finished to its final outside diameter and surface finish. Next, the longitudinal axial opening is pierced through a described in connection with step 170 of FIG. 13, using electro-discharge machining, electro-chemical machining, or a laser beam, for a very small hole. This piercing may be done for improved concentricity while the piece is rotated, but stationary mounting also can be used. Now the pierced longitudinal opening 196 in FIG. 19 may be honed and lapped to its final diameter and surface finish. Any deburring, etc., part marking and other aids for the user are carried out at this last stage.

Figure 20:
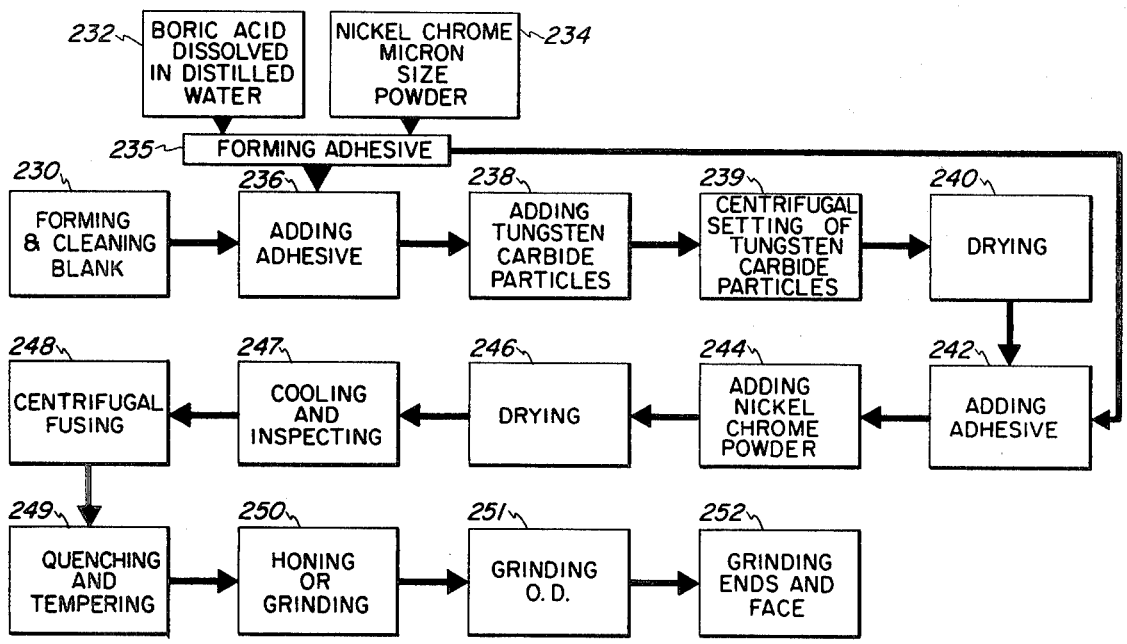
FIG. 20 is a block diagram showing the steps in another method of forming articles made by a method of the invention.

FIG. 20 is a block diagram of another method of the invention, similar to the method depicted in FIG. 1, but including added steps provided to increase the density and decrease the porosity of the inner coating of tungsten carbide distributed throughout the matrix of nickel chrome. Thus, steps 230, 232, 234, 236, and 238 correspond directly to the earlier-described steps 30, 32, 34, 36 and 38. However, in the instant embodiment, after the tungsten carbide particles are applied to the wet adhesive coated surface (step 238) the blank is rotated about its central longitudinal axis to induce about 50 to 75 gravities of force radially outwardly in the coating for about 5 to 7 seconds (step 239). Such centrifugal setting of the tungsten carbide particles while the adhesive is still wet will compact or densify the particles. After compacting the tungsten carbide particles, the procedure once again follows the earlier described steps, with steps 240, 242, 246 and 247 corresponding to steps 40, 42, 44, 46 and 47, respectively.

Again, the procedure of the instant method departs from the earlier-described procedure after step 247. Thus, subsequent to cooling the part to room temperature and inspection (step 247), the coating is metallurgically fused to the blank while the blank again is rotated about its central longitudinal axis to induce about 180 to 200 gravities of force in radially outward direction in the coating (step 248). In this manner, the fused nickel chrome will be urged to fill the interstices between the tungsten carbide particles, thereby tending to eliminate entrapped air, gas, solid particles of boric acid or any other lightweight foreign material and evening out the coating. In the earlier-described method, filling of the interstices depended upon capillary action during fusing. In the instant method, a positive force is induced within the coating in a direction generally perpendicular to the coated surface to effectively eliminate possible voids. As before, the temperature of the part is raised to the order between 1925° and 2025° F. and the part is held at that temperature, while being rotated, in an appropriate atmosphere. Since rotation increases the speed with which the interstices are filled, the part need be held at the elevated temperature and simultaneously rotated only for about 30 to 40 seconds.

Subsequently, the part is quenched and tempered (step 249), and then finished by honing or grinding the inside diameter (step 250), grinding the outside diameter (step 251) and finishing the end faces (step 252).

Figure 21:
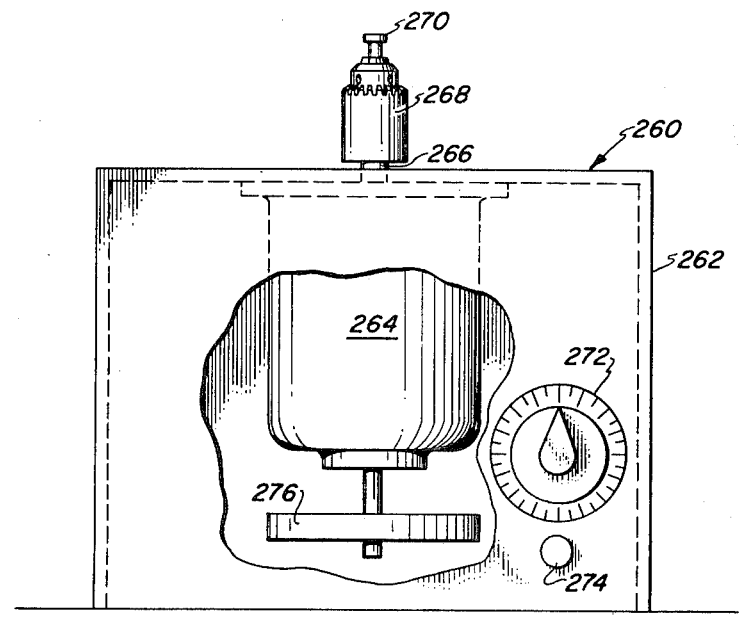
FIG. 21 is an elevational view of a simple rotating apparatus employed in the method of FIG. 20, with portions broken away to illustrate component parts.

FIG. 21 illustrates a simple rotating fixture for carrying out the centrifugal setting of the tungsten carbide particles (step 239). As seen in FIG. 21, machine 260 includes a frame 262 upon which there is mounted an electric motor 264 having a vertical drive shaft 266. A chuck 268 is carried by the drive shaft 266 for rotation therewith and receives a blank 270 to be processed. A speed control 272 is calibrated to read in terms of the inside diameter of the blank and selects the appropriate speed of rotation of motor 264 to induce the desired 50 to 75 gravities in the coating, for the particular inside diameter of the blank 270 being processed. An automatic start and stop control 274 operates in connection with a brake 276 to activate motor 264 for the prescribed amount of time.

Figure 22:
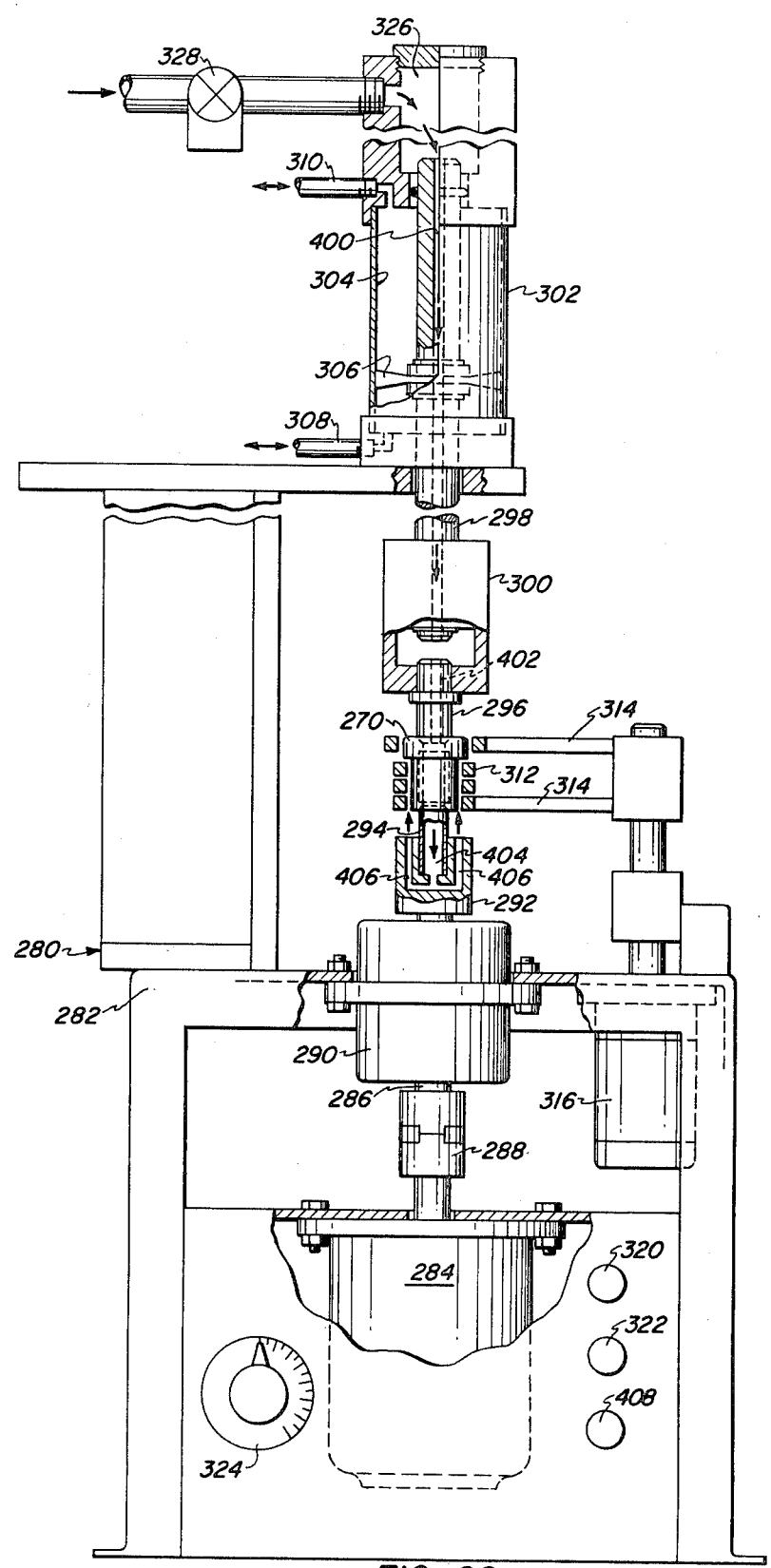
FIG. 22 is an elevational view of a rotating and fusing apparatus employed in the method of FIG. 20, with portions broken away to illustrate component parts.

FIG. 22 shows an apparatus for carrying out the step of centrifugal fusing of the coating in blank 270 (step 248). As seen in FIG. 22, apparatus 280 has a frame 282 upon which is mounted an electric motor 284 coupled to a drive shaft 286 through a coupling 288. Drive shaft 286 is journaled for rotation in a bearing block 290 and carries a fitting 292 having a lower mandrel 294 projecting upwardly therefrom. An upper mandrel 296 is carried by a vertical rod 298 and is journaled for rotation relative to rod 298 by means of a bearing arrangement 300. Rod 298 is a part of a fluid actuator 302 which is mounted on frame 282 and which includes a cylinder 304, and a piston 306 affixed to the rod 298 and movable within the cylinder 304. Fluid, such as air, supplied at passage 308 will raise piston 306 and rod 298 to raise upper mandrel 296 relative to lower mandrel 294. When the upper mandrel 296 is in the raised position, blank 270 can be placed upon the lower mandrel 294. Fluid supplied at passage 310 will then lower the upper mandrel 296 to clamp the blank between the mandrels 294 and 296.

An induction coil 312 is supported by arms 314 movable by an actuator 316 between upper and lower positions. In the upper position of arms 314, as illustrated, induction coil 312 is in position to surround the blank 270 and heat the blank to the desired temperature. In the lower position of arm 314, induction coil 312 is retracted to permit access for loading and unloading blanks 270 between the mandrels 294 and 296.

Actuation of fluid actuator 302 is controlled by control button 320 for enabling loading and unloading of blanks 270. A cycle start control 322 initiates a controlled cycle which places the induction coil 312 in position for heating, activates the induction coil and actuates motor 284 to rotate the blank 270 for a prescribed timed duration. A speed control 324 is calibrated in terms of inside diameter of the blank 270 to enable selection of an appropriate speed of rotation to induce 180 to 200 gravities of force in the coating in the blank. While the blank is rotated and heated, a suitable gaseous mixture such as a mixture of about 95% argon and 5% hydrogen is supplied to a chamber 326 through a solenoid operated control valve 328. The gaseous mixture flows from chamber 326 through a conduit 400 in rod 298 to an upper passage 402 through upper mandrel 296 and into the blank 270. The gaseous mixture fills the blank 270 and proceeds through a lower passage 404 to exhaust ducts 406 in fitting 292. Exhaust ducts 406 direct the gaseous mixture upwardly toward the blank 270 along the exterior of the blank. Thus, the appropriate inert atmosphere is provided during rotation of the blank and fusing of the coating within the blank. A further control 408 is provided for any emergency stop of the cycle of operation.

Figure 23:
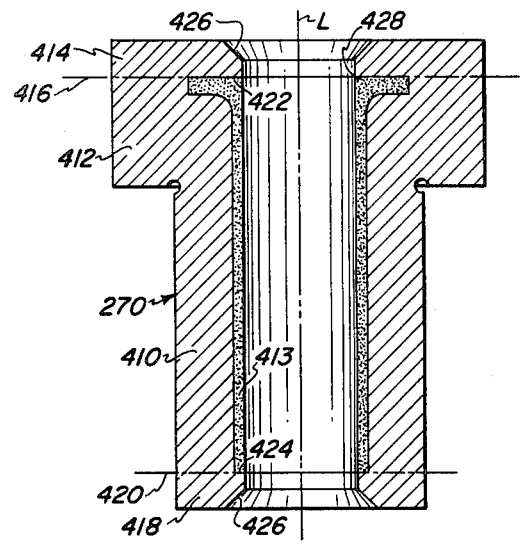
FIG. 23 is a longitudinal cross-sectional view of a flanged blank employed in making an article by a method of the invention.

FIG. 23 illustrates a blank 270 having a construction suited to the method depicted in FIG. 20. Blank 270 has a body 410, a head 412 and a coating 413 made up of a matrix of nickel chrome throughout which are distributed particles of tungsten carbide to be fused to the inner surface of the body 410 and a portion of the inner surface of the head 412. Blank 270 is employed in making a drill bushing and has a longitudinal length greater than the finished drill bushing by an added head portion 414, which extends axially outwardly beyond line 416 and an added body portion 418, which extends axially outwardly beyond line 420. Portions 414 and 418 extend radially inwardly beyond the coating 413 and provide dams at 422 and 424 to contain the materials of the coating 413 during rotation of the blank 270 about longitudinal axis L while the coating 413 is fused. A chamfer 426 at each end of the blank 270 enables proper seating of the upper and lower mandrels 294 and 296 of the apparatus 280.

In order to finish the blank 270 to construct a drill bushing, the portions 414 and 418 are removed, as by grinding the ends of the blank 270 down to the lines 416 and 420 and providing a radius at edge 428 (step 252), leaving a finished drill bushing similar to that depicted in FIG. 8.

Figure 24:
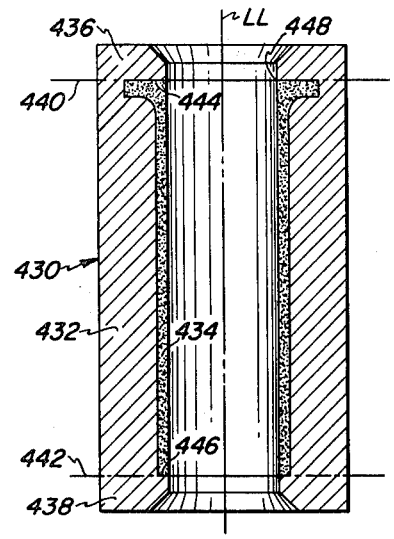
FIG. 24 is a longitudinal cross-sectional view of a straight blank employed in making an article by a method of the invention.

FIG. 24 illustrates another blank 430 for constructing a straight drill bushing similar to that shown in FIG. 9. Blank 430 has a body 432 and a coating 434 along an inner surface of the body. Portions 436 and 438 extend outwardly beyond lines 440 and 442, respectively, and establish dams at 444 and 446 for containing the fused coating during rotation of the blank about longitudinal axis LL. Portions 436 and 438 are removed, subsequently, down to lines 440 and 442, and a radius is provided at edge 448 to complete the straight drill bushing.

Figure 25:
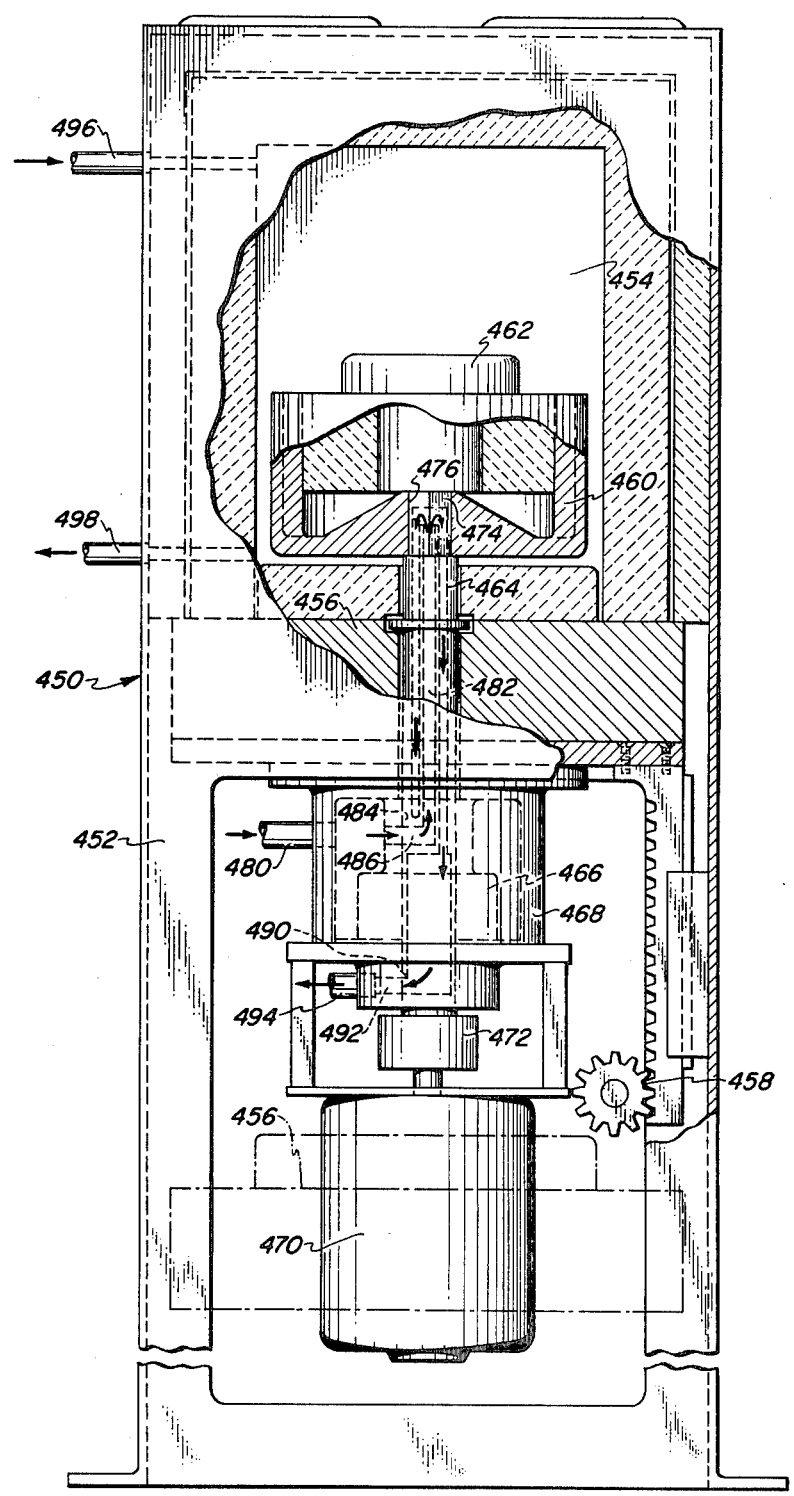
FIG. 25 is an elevational view of a furnace employed in a method of the invention.

FIG. 25 illustrates a furnace 450 for carrying out the step of fusing while rotating (step 248) either larger blanks such as those used for drill bushings having an inside diameter of 1¾" or over, or batches of small blanks, such as those used for small bushings, having a blind hole similar to those illustrated in FIGS. 14 and 18. Furnace 450 includes a frame 452 which supports an elevated insulated furnace chamber 454 having a bottom panel 456. Bottom panel 456 is supported on the frame 452 for relative sliding movement between an upper, closed chamber position, shown in full lines in FIG. 25, and a lower, open chamber position, shown in phantom in the same figure. Movement between the upper and lower positions is effected by means of a motor-driven rack and pinion arrangement 458 to enable selective charging and discharging of the items to be treated in furnace chamber 454.

A fixture 460 is placed above the bottom panel 456 and holds the item or items to be treated in the furnace. In FIG. 25, the fixture 460 holds a large drill bushing blank 462 which is to be heated and rotated to perform step 248. In order to provide for the rotation of blank 462, fixture 460 is mounted upon a vertical shaft 464 which is journaled for rotation within a bearing assembly 466 carried by a sub-frame 468 affixed to bottom panel 456. A motor 470, also carried by sub-frame 468, is coupled to one end of shaft 464 by a coupling 472, while the other end of shaft 464 includes a square drive configuration 474 received within a complementary socket 476 in the fixture 460. Thus, activation of motor 470 will turn shaft 464 and rotate fixture 460. The speed of rotation is controlled by an electronic speed control (not shown).

In order to protect the shaft 464 from excessive heat, cooling water is circulated through the shaft. An inlet 480 leads to a central tube 482 within shaft 464 through a manifold 484 and port 486 and enables cooling water to be supplied to tube 482. The cooling water flows upwardly, under pressure, and at the top of tube 482 turns downwardly into passages 488 which serve as a return conduit, returning the water through ports 490 and manifold 492 to an outlet 494. A suitable inert atmosphere is provided within chamber 454 by passing an inert gaseous mixture through an inlet 496 into chamber 454 while the chamber is purged through an outlet 498.

Figure 26:
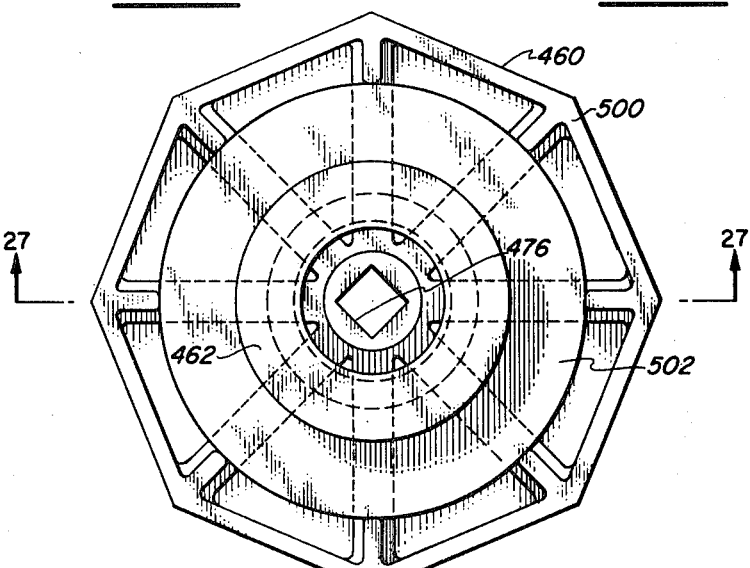
FIG. 26 is an enlarged plan view of a fixture employed in connection with the furnace of FIG. 25.
Figure 27:
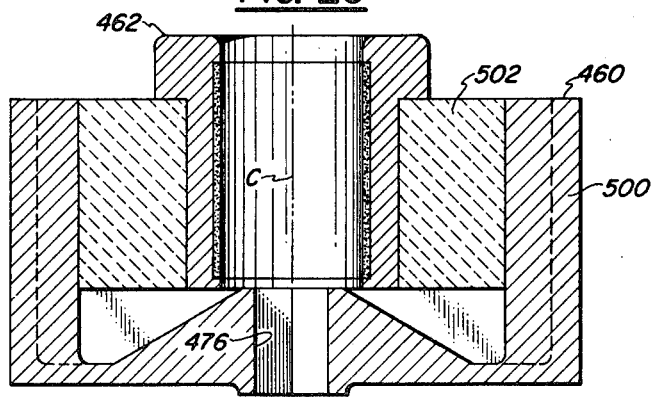
FIG. 27 is a cross-sectional view taken along line 27—27 of FIG. 26.
Figure 28:
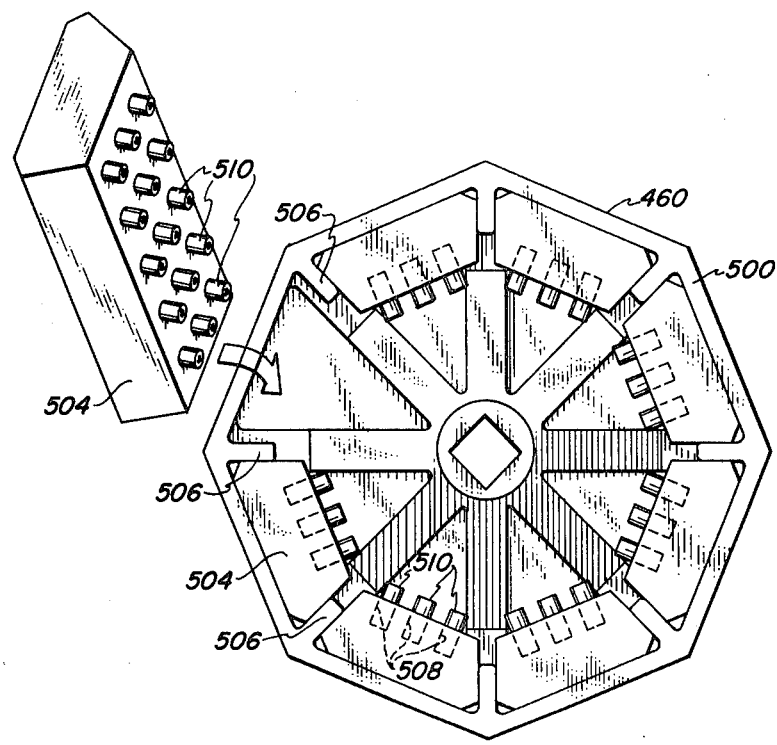
FIG. 28 is a plan view similar to FIG. 26, but showing an alternate use of the fixture.

As seen in FIGS. 26 and 27, fixture 460 has an outer shell 500 which receives a cylindrical insert 502 of ceramic, graphite or other refractory material, which enables the blank 462 to be supported for rotation about the central longitudinal axis C thereof. Where furnace 450 is to be utilized for batches of small blanks used for small bushings having a blind hole, cylindrical insert 502 is removed and is replaced by two or more opposed wedge-shaped inserts 504, also constructed of ceramic, graphite or another refractory material, as seen in FIG. 28. Inserts 504 are supported and captured between adjacent ribs 506 of the fixture 460 and each includes a plurality of horizontally oriented openings 508 for receiving small blanks 510 which are then rotated with fixture 460, while being heated, to induce forces urging the fused mixture within the blanks 510 toward the bottom of the blind hole in each blank, thereby compacting the tungsten carbide particles within the matrix of nickel chrome and eliminating all voids while expelling entrapped gas and lightweight foreign materials.

Figure 29:
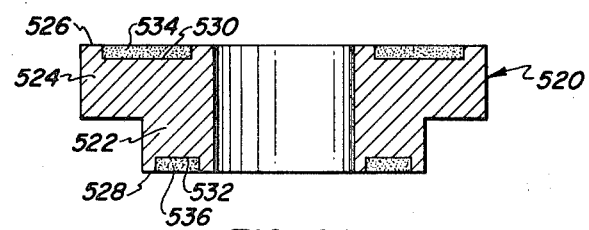
FIG. 29 is a longitudinal cross-sectional view of another article made by a method of the invention, in the form of a pump seal.

FIG. 29 shows a pump seal 520 constructed by a method of the invention. Pump seal 520 includes a steel body 522 having a generally cylindrical configuration including a flange 524 at one end thereof. The end faces 526 and 528 each have a respective annular recess 530 and 532 and each recess if filled respectively with a coating 534 and 536 of tungsten carbide particles distributed throughout a matrix of nickel chrome, the coatings providing wear-resistant liners and resembling the coatings described in connection with the bushings illustrated above. The liners provided by coatings 534 and 536 enable maintenance of the accurate location of an abutting, relatively moving element as the surfaces of the moving element and the liners continue to move relative to one another.

The basic method for making the pump seal 520 resembles the above-described methods for making bushings insofar as concerns the formation of a pump seal blank 538 (see FIG. 30) and the placing of the adhesive and tungsten carbide particles within the recesses of the blank. However, in order to eliminate voids within the coatings 534 and 536 an alternate is employed in place of the application of centrifugal force during fusion of the coatings. Instead, each coating is fused while being vibrated preferably in directions parallel to the central longitudinal axis P of the blank 538.

Figure 30:
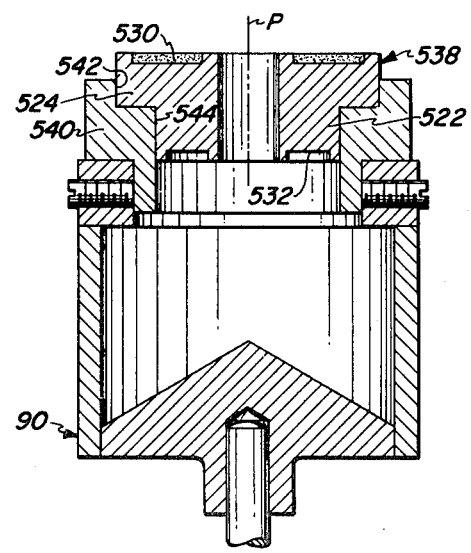
FIG. 30 is an elevational, cross-sectional view of a modified machine similar to that of FIG. 5.

Thus, in the method for making pump seal 520, the initial steps are very much the same as steps 32 through 47 shown in FIG. 1, and apparatus similar to that of FIG. 5 can be employed to fill each recess 530 and 532, one at a time. Machine 90 of FIG. 5 is modified to replace sleeve 100 and holder 102 with another sleeve 540 similar to sleeve 100, but with inside dimensions suited to the support of the blank 538 for pump seal 520, all as shown in FIG. 30. The apparatus is re-oriented so that the blank 538 is supported with its central longitudinal axis P extending in a vertical direction, as seen in FIG. 30. Sleeve 540 has a larger bore 542 with an inside diameter complementary to the diameter of flange 524 and a smaller bore 544 with an inside diameter complementary to the diameter of the other end of body 522. Hence, pump seal blank 538 may be seated in sleeve 540 with either recess 530 or 532 facing upwardly to receive a deposit of particles and adhesive.

Figure 31:
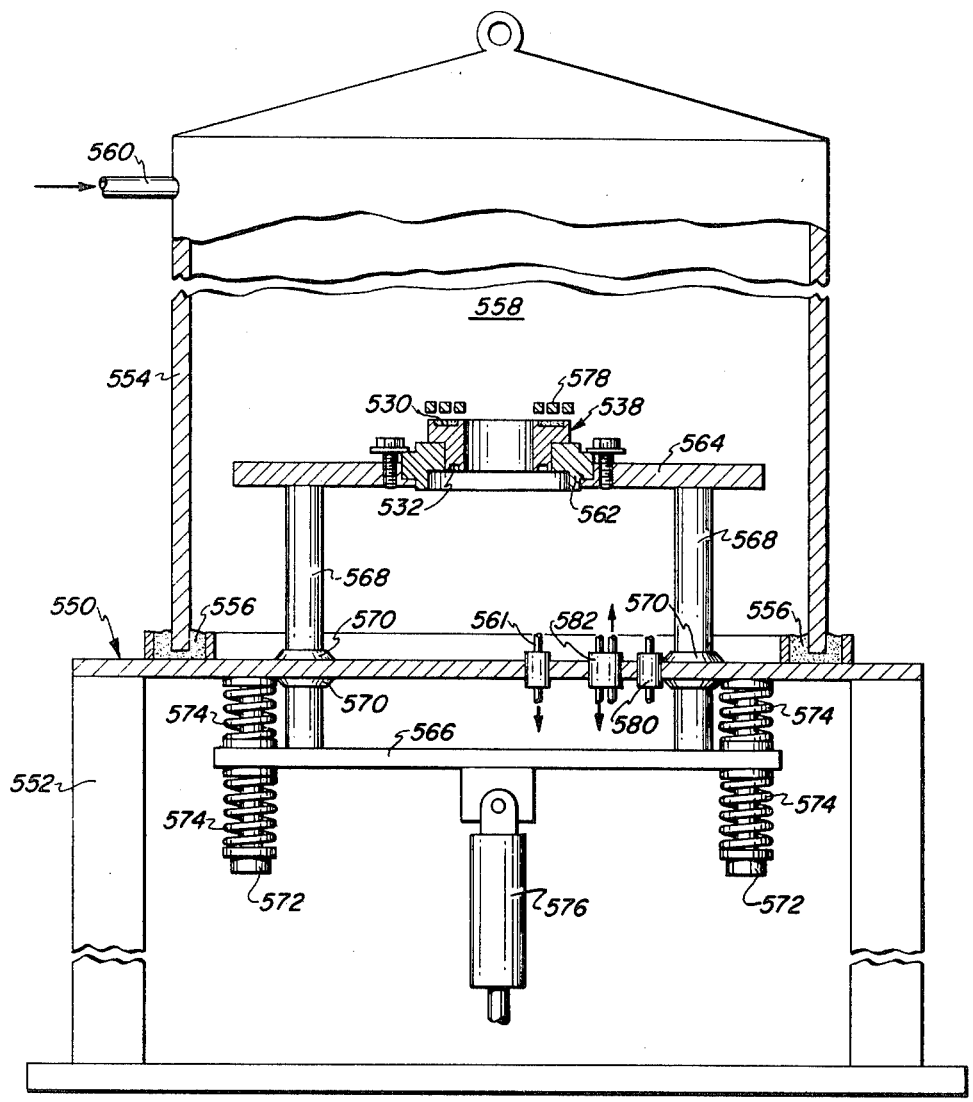
FIG. 31 is an elevational view of a vibrating and fusing apparatus employed in an alternate method of the invention, with portions broken away to illustrate component parts.

Once one recess 530 is filled with the appropriate coating with all of steps 32 through 47 having been performed to fill recess 530, pump seal blank 538 is placed in a vibrating apparatus for simultaneous fusion of the coating within recess 530 and vibration of the blank 538 preferably in vertical directions, parallel to the central longitudinal axis P of the blank 538 and generally perpendicular to the recess 530. As seen in FIG. 31, blank 538 is placed in apparatus 550 which includes a stationary frame 552 supporting a hood 554 seated within a sand seal 556 to establish a closed chamber 558. Hood 554 may be lifted from frame 552 to gain access to chamber 558. As in the earlier-described arrangements, an inert gaseous mixture such as a mixture of argon and hydrogen is supplied through a supply line 560 to establish an appropriate atmosphere within closed chamber 558, while purging the chamber through purge line 561.

Figure 32:
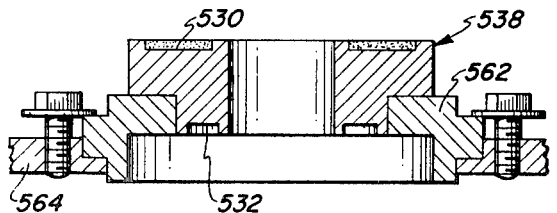
FIG. 32 is an enlarged fragmentary elevational view of a portion of FIG. 31 showing the article being processed.

As best seen in FIG. 32, as well as in FIG. 31, blank 538 is placed within a support ring 562 secured to a platform 564 carried by a sub-frame 566 having posts 568 passing through dynamic seals 570 in frame 552. A suspension system 572 supports the sub-frame 566 on the stationary frame 522 and includes opposed helical springs 574 which permit upward and downward movement of the sub-frame 566 relative to the stationary frame 522. An air-driven vibrator 576 is coupled to the sub-frame 566 for vibrating the sub-frame in a vertical direction through a typical amplitude of about 0.0005 to 0.001 inch at a rate of about 16,000 to 20,000 cycles per minute.

When sub-frame 566 is vibrated, blank 538 will be vibrated with the sub-frame. At the same time, an induction coil 578, located immediately above the coating in recess 530 of blank 538 is activated to heat the blank 538 locally and fuse the coating in recess 530. Power is provided to induction coil 578 through a first fitting 580, while cooling water is provided for coil 578 through further fitting 582. Vibration and heating are continued simultaneously for about 30 to 90 seconds to attain complete fusion, the filling of voids and expulsion of gases and other lightweight foreign materials.

Figure 33:
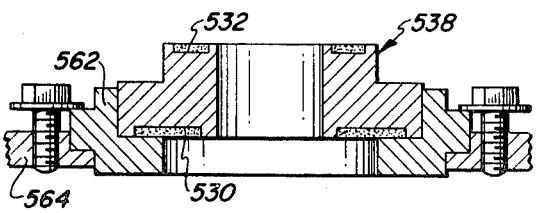
FIG. 33 is a view similar to FIG. 32, but with the article in an alternate position.

The entire procedure is repeated for establishing the fused coating 536 in recess 532; that is, the blank 538 is again placed in sleeve 540 in a modified machine 90, but with recess 532 facing upwardly. Once recess 532 is filled, blank 538 is transferred to ring 562 of apparatus 550, but with ring 562 inverted and recess 532 facing upwardly as seen in FIG. 33. The blank again is subjected to vibration while the coating 536 is fused in recess 532. It is noted that since the induction coil 578 effects only local heating, fusion of coating 536 will not cause coating 534 to be fused again. Upon completion of the step of fusing while vibrating to complete coating 536, the blank 538 is removed from apparatus 550 to be quenched, tempered and finished to establish pump seal 520. Thus, the step of vibrating while fusing serves to establish improved wear-resistant coatings having flat surfaces for component parts in which such flat surfaces are desired.

While particular embodiments of the invention have been shown and described, it is apparent to those skilled in the art that modifications are possible without departing from the spirit of the invention or the scope of the subjoined claims.

I claim:

1. The method of forming a hollow bushing or similar article which comprises:
   forming a blank having the desired outer and inner configurations and a central longitudinal axis;
   cleaning the blank so that it is free of contaminants;
   forming an adhesive of boric acid dissolved in distilled water and nickel chrome powder;
   applying the wet adhesive to the inner surface of the blank;
   adding tungsten carbide particles to the wet adhesive so that the wetted surface captures the tungsten carbide particles;
   drying the blank at a temperature of the order of 350° to 400° F. for a time sufficient to remove the water and moisture from the blank;
   adding further wet adhesive to the coated inner surface of the blank;
   adding nickel chrome powder to the wet adhesive to the coated inner surface so that the wetted surface captures the nickel chrome powder;
   drying the blank at a temperature of the order of 350° to 400° F. for a time sufficient to remove the water and moisture from the blank;
   raising the temperature of the blank to a temperature of the order of 1925° to 2025° F.;
   tempering the blank for a time and at a temperature appropriate for treating the body of the blank; and
   finishing the blank to the desired size and smoothness.

2. The invention of claim 1 including holding the blank at the temperature of the order of 1925° to 2025° F. for a period of 3 to 5 minutes.

3. The invention of claim 1 including rotating the blank about the central longitudinal axis after adding the tungsten carbide particles to the wet adhesive and before drying the blank prior to adding further wet adhesive to the coated inner surface of the blank to induce an outwardly directed force of about 50 to 75 gravities in the tungsten carbide particles and wet adhesive.

4. The invention of claim 3 including rotating the blank about the central longitudinal axis while the blank is held at the temperature of the order of 1925° to 2025° F. for a period of 30 to 40 seconds to induce an outwardly directed force of about 180 to 200 gravities in the tungsten carbide and nickel chrome coated on the inner surface.

5. The invention of claim 1 including rotating the blank about the central longitudinal axis while the blank is held at the temperature of the order of 1925° to 2025° F. for a period of 30 to 40 seconds to induce an outwardly directed force of about 180 to 200 gravities in the tungsten carbide and nickel chrome coated on the inner surface.

6. The method of forming a hollow drill bushing or similar article which comprises:
   forming a blank having the desired outer configuration;
   cleaning the blank so that it is free of contaminants;
   drilling a blind longitudinal opening in the blank;
   forming an adhesive of boric acid dissolved in distilled water and nickel chrome powder;
   applying the adhesive to the surface of the longitudinal opening;
   precoating tungsten carbide particles with the adhesive;
   filling the longitudinal opening with the precoated tungsten carbide particles;
   drying the blank at a temperature of the order of 350° to 400° F. for a time sufficient to remove the water and moisture from the blank;
   adding adhesive to the longitudinal opening;
   adding a measured amount of nickel chrome particles at the top of the longitudinal opening;
   drying the blank at a temperature of the order of 350° to 400° F. for a time sufficient to remove the water and moisture from the blank;
   raising the temperature of the blank to a temperature of the order of 1925° to 2025° F.;
   tempering the blank for a time and at a temperature appropriate for treating the body of the blank;
   removing the top and bottom of the blank to thereby expose the ends of the filled longitudinal opening;
   piercing an opening through the filling longitudinal opening; and
   finishing the blank to the desired size and smoothness.

7. The invention of claim 6 including rotating the blank while the blank is held at the temperature of the order of 1925° to 2025° F. for a period of 30 to 40 seconds to induce a force of about 180 to 200 gravities in the tungsten carbide and nickel chrome in the opening.

8. The invention of claim 6 including holding the blank at the temperature of the order of 1925° to 2025° F. for a period of 3 to 5 minutes.

9. The invention of claim 8 wherein:
   the step of piercing the opening is carried out by electro-piercing.

10. The invention of claim 8 wherein:
    the step of piercing the opening is carried out by electro-discharging.

11. The invention of claim 8 wherein:
the step of piercing the opening is carried out by a laser beam.

12. In the method of forming a wear-resistant liner on a bushing, a seal or a similar article, the steps comprising:
forming a blank having a surface which will receive the wear-resistant liner;
cleaning at least said surface of the blank so that the surface is free of contaminants;
forming a wet adhesive which includes nickel chrome powder;
applying the wet adhesive to said surface of the blank;
adding tungsten carbide particles to the adhesive;
drying the adhesive and the tungsten carbide particles added thereto to establish an initial coating on said surface;
adding further wet adhesive to the initially coated surface;
adding nickel chrome powder to the further wet adhesive;
drying the further wet adhesive and the nickel chrome powder added thereto to establish a complete coating on said surface; and
raising the temperature of the blank at said surface to a temperature of the order of 1925° to 2025° F. and holding the blank at said temperature to fuse the nickel chrome and bond the tungsten carbide particles in a liner adhered to said surface.

13. The invention of claim 12 including compacting the tungsten carbide particles after adding the tungsten carbide particles to the adhesive and before drying the adhesive with the tungsten carbide particles added thereto.

14. The invention of claim 12 including inducing a force in the complete coating while holding the blank at said temperature, the force tending to eliminate voids in the coating and expelling unwanted foreign material.

15. The invention of claim 14 wherein said force extends from the complete coating toward said surface and is generally perpendicular to said surface.

16. The invention of claim 14 wherein the force is induced by rotating the blank.

17. The invention of claim 14 wherein the force is induced by vibrating the blank.

* * * * *